(12) United States Patent
Welc et al.

(10) Patent No.: US 8,086,827 B2
(45) Date of Patent: Dec. 27, 2011

(54) MECHANISM FOR IRREVOCABLE TRANSACTIONS

(75) Inventors: Adam Welc, San Francisco, CA (US); Bratin Saha, San Jose, CA (US); Ali-Reza Adl-Tabatabai, Santa Clara, CA (US)

(73) Assignee: Intel Corporation, Santa Clara, CA (US)

( * ) Notice: Subject to any disclaimer, the term of this patent is extended or adjusted under 35 U.S.C. 154(b) by 380 days.

(21) Appl. No.: 11/648,485

(22) Filed: Dec. 28, 2006

(65) Prior Publication Data

US 2008/0162881 A1 Jul. 3, 2008

(51) Int. Cl.
*G06F 9/30* (2006.01)
(52) U.S. Cl. ............................................ 712/225
(58) Field of Classification Search .................. None
See application file for complete search history.

(56) References Cited

U.S. PATENT DOCUMENTS 5,428,761 A * 6/1995 Herlihy et al. ................ 711/130

OTHER PUBLICATIONS

Blundell et al. "Unrestricted Transactional Memory: Supporting I/O and System Calls within Transactions". May 2006, pp. 1-12.*
Damron et al. "Hybrid Transactional Memory". Oct. 25, 2006, entire document.*
Ald-Tabatabai et al. "Compiler and Runtime Support for Efficient Software Transactional Memory". Jun. 16, 2006, pp. 26-37.*
Tanenbaum, Andrew. "Structured Computer Organization". Prentice-Hall, Inc. Second Edition. 1984, pp. 10-12.*

* cited by examiner

*Primary Examiner* — Robert Fennema
(74) *Attorney, Agent, or Firm* — David P. McAbee (57) ABSTRACT

A method and apparatus for designating and handling irrevocable transaction is herein described. In response to detecting an irrevocable event, such as an I/O operation, a user-defined irrevocable designation, and a dynamic failure profile, a transaction is designated as irrevocable. In response to designating a transaction as irrevocable, Single Owner Read Locks (SORLs) are acquired for previous and subsequent reads in the irrevocably designated transaction to ensure the transaction is able to complete without modification to locations read from, while permitting remote resources to load from those locations to continue execution.

13 Claims, 5 Drawing Sheets

MECHANISM FOR IRREVOCABLE TRANSACTIONS

FIELD

This invention relates to the field of processor execution and, in particular, to execution of groups of instructions.

BACKGROUND

Advances in semi-conductor processing and logic design have permitted an increase in the amount of logic that may be present on integrated circuit devices. As a result, computer system configurations have evolved from a single or multiple integrated circuits in a system to multiple cores and multiple logical processors present on individual integrated circuits. A processor or integrated circuit typically comprises a single processor die, where the processor die may include any number of cores or logical processors.

The ever increasing number of cores and logical processors on integrated circuits enables more software threads to be executed. However, the increase in the number of software threads that may be executed simultaneously have created problems with synchronizing accesses to shared data. One common solution to accessing shared data in multiple core or multiple logical processor systems comprises the use of locks to guarantee mutual exclusion across multiple accesses to shared data. However, the ever increasing ability to execute multiple software threads potentially results in false contention and a serialization of execution.

For example, consider a hash table holding shared data. With a lock system, a programmer may lock the entire hash table, allowing one thread to access the entire hash table. However, throughput and performance of other threads is potentially adversely affected, as they are unable to access any entries in the hash table, until the lock is released. Alternatively, each entry in the hash table may be locked. However, this increases programming complexity, as programmers have to account for more locks within a hash table.

Another data synchronization technique includes the use of transactional memory (TM). Often transactional execution includes speculatively executing a grouping of a plurality of micro-operations, operations, or instructions. In the example above, both threads execute within the hash table, and their accesses are monitored/tracked. If both threads access/alter the same entry, one of the transactions may be aborted to resolve the conflict.

However, speculative transactional execution usually relies on the ability to undo speculative transactional updates in response to aborting the transaction. Yet, some operations, such as I/O operations, are difficult to roll-back or undo. As a result, typically, when an I/O event or operations is detected in a transaction, the transaction is aborted to execute non-speculatively, potentially wasting previous execution cycles within the transaction.

BRIEF DESCRIPTION OF THE DRAWINGS

The present invention is illustrated by way of example and not intended to be limited by the figures of the accompanying drawings.

FIG. 4b illustrates an embodiment of a continued flow diagram from FIG. 4a.

DETAILED DESCRIPTION

In the following description, numerous specific details are set forth such as examples of specific hardware support for transactional execution, specific tracking methods, /meta-data uses, specific types of local memory in processors, and specific types of memory accesses and locations, etc. in order to provide a thorough understanding of the present invention. It will be apparent, however, to one skilled in the art that these specific details need not be employed to practice the present invention. In other instances, well known components or methods, such as coding of transactions in software, demarcation of transactions, specific multi-core and multi-threaded processor architectures, interrupt generation/handling, cache organizations, and specific operational details of microprocessors, have not been described in detail in order to avoid unnecessarily obscuring the present invention.

A value, as used herein, includes any known representation of a number, a state, a logical state, or a binary logical state. Often, the use of logic levels, logic values, or logical values is also referred to as 1's and 0's, which simply represents binary logic states. For example, a 1 refers to a high logic level and 0 refers to a low logic level. However, other representations of values in computer systems have been used. For example the decimal number 10 may also be as a binary value of 1010 and a hexadecimal letter A.

Moreover, states may be represented by values or portions of values. As an example, a locked state may be represented by a first value in a location, such as an odd number, while a version number, such as an even value, in the location represents an unlocked state. Here, a portion of the first and second value may be used to represent the states, such as two lower bits of the values, a sign bit associated with the values, or other portion of the values. Often a traditional lock refers to locks explicitly utilized by users/programmers to implement access synchronization, while transactional locks, such as a read/write, write, or Single Owner Read Lock (SORL) are often constructs of transactional execution to provide synchronization.

The method and apparatus described herein are for designating a transaction as irrevocable and handling irrevocable transactions. Specifically, designating a transaction as irrevocable and handling irrevocable transactions are primarily discussed in reference to multi-core processor computer systems. However, the methods and apparatus for designating a transaction as irrevocable and handling irrevocable transactions are not so limited, as they may be implemented on or in association with any integrated circuit device or system, such as cell phones, personal digital assistants, embedded controllers, mobile platforms, desktop platforms, and server platforms, as well as in conjunction with other resources, such as hardware/software threads, that utilize transactional memory.

Figure 1:
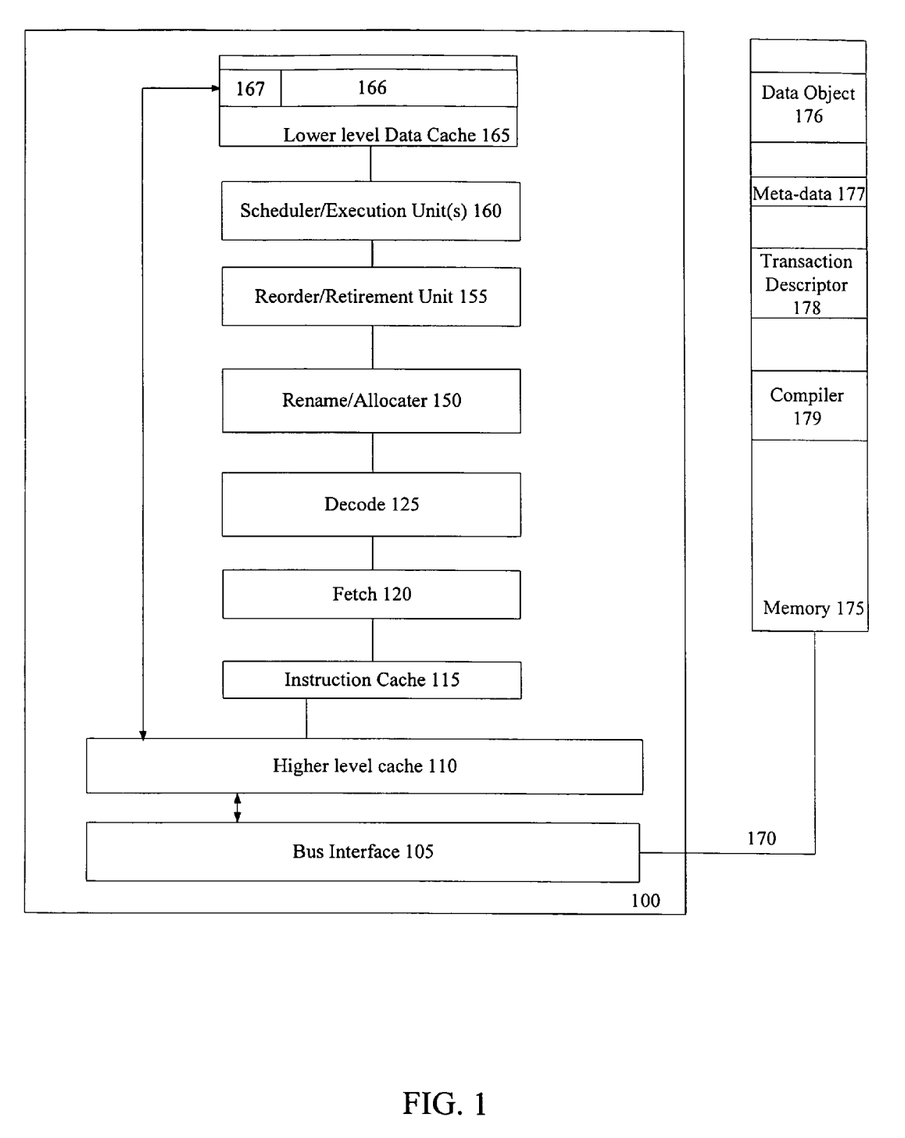
FIG. 1 illustrates an embodiment of a system including a processor and a memory capable of transactional execution.

Referring to FIG. 1, an embodiment of a processor capable of designating a transaction as irrevocable and handling irrevocable transactions is illustrated. In one embodiment, processor 100 is a multi-core processor capable of executing multiple threads in parallel. However processor 100 may include any processing element, such as an embedded processor, cell-processor, microprocessor, or other known processor, which is capable of executing one thread or multiple threads. As an illustrative example, a simplified embodiment of an out-of-order architecture for a processor is illustrated in FIG. 1.

The modules shown in processor 100, which are discussed in more detail below, are potentially implemented in hardware, software, firmware, or a combination thereof. Note that the illustrated modules are logical blocks, which may overlap the boundaries of other modules, and may be configured or interconnected in any manner. In addition, the modules as shown in FIG. 1 are not required in processor 100. Furthermore, other modules, units, and known processor features may also be included in processor 100.

Bus interface module 105 is to communicate with a device, such as system memory 175, a chipset, a north bridge, or other integrated circuit. Typically bus interface module 105 includes input/output (I/O) buffers to transmit and receive bus signals on interconnect 170. Examples of interconnect 170 include a Gunning Transceiver Logic (GTL) bus, a GTL+ bus, a double data rate (DDR) bus, a pumped bus, a differential bus, a cache coherent bus, a point-to-point bus, a multi-drop bus or other known interconnect implementing any known bus protocol.

Processor 100 is coupled to memory 175, which may be dedicated to processor 100 or shared with other devices in a system. Examples of memory 175 includes dynamic random access memory (DRAM), static RAM (SRAM), non-volatile memory (NV memory), and long-term storage. Bus interface unit 105 as shown is also to communicate with higher level cache 110.

Higher-level cache 110 is to cache recently fetched and/or operated on elements. In one embodiment, higher-level cache 110 is a second-level data cache. However, higher level cache 110 is not so limited, as it may be or include instruction cache 115 to store recently fetched/decoded instructions. Instruction cache 115, which may also be referred to as a trace cache, is illustrated before fetch logic 120 and decode logic 125. Here, instruction cache 115 stores recently fetched instructions that have not been decoded. Yet, instruction cache 115 is potentially placed after fetch logic 120 and/or after decode logic 125 to store decoded instructions.

Fetch logic 120 is to fetch data/instructions to be operated on/executed. Although not shown, in one embodiment, fetch logic includes or is associated with branch prediction logic, a branch target buffer, and/or a prefetcher to predict branches to be executed/taken and pre-fetch instructions along a predicted branch for execution. Here, a processor capable of speculative execution potentially prefetches and speculatively executes predicted branches. Decode logic 125 is coupled to fetch logic 120 to decode fetched elements.

Allocator and renamer module 150 includes an allocator to reserve resources, such as register files to store instruction processing results and a reorder buffer to track instructions. Unit 130 may also include a register renamer to rename program/instruction reference registers to other registers internal to processor 100. Reorder/retirement module 125 includes components, such as the reorder buffers mentioned above, to support out-of-order execution and later retirement of instructions executed out-of-order. In one embodiment, where processor 100 is an in-order execution processor, re-order/retirement module 155 may not be included.

Scheduler and execution module 120, in one embodiment, includes a scheduler unit to schedule instructions/operations on execution units. Register files associated with execution units are also included to store information instruction processing results. Exemplary execution units include a floating point execution unit, an integer execution unit, a jump execution unit, a load execution unit, a store execution unit, and other known execution units.

Also shown in FIG. 1 is lower level data cache 165. Data cache 165 is to store recently used/operated on elements, such as data operands, objects, units, or items. In one embodiment, a data translation lookaside buffer (DTLB) is associated with lower level data cache 165. Often a processor logically views physical memory as a virtual memory space. As a specific example, a processor may include a page table structure to view physical memory as a plurality of virtual pages. Here, a DTLB supports translation of virtual to linear/physical addresses. Data cache 165 may be utilized as a transactional memory or other memory to track tentative accessed during execution of a transaction, as discussed in more detail below.

In one embodiment, processor 100 is a multi-core processor. A core often refers to any logic located on an integrated circuit capable of maintaining an independent architectural state, wherein each independently maintained architectural state is associated with at least some dedicated execution resources. In one embodiment, execution resources, such as execution module 160, include physically separate execution units dedicated to each core. However, execution module 160 may include execution units that they are physically arranged as part of the same unit or in close proximity; yet, portions of execution module 160 are logically dedicated to each core. Furthermore, each core may share access to processor resources, such as higher level cache 110.

In another embodiment, processor 100 includes a plurality of hardware threads. A hardware thread typically refers to any logic located on an integrated circuit capable of maintaining an independent architectural state, wherein the independently maintained architectural states share access to some execution resources. For example, smaller resources, such as instruction pointers, renaming logic in rename allocater logic 150, an instruction translation buffer (ILTB) may be replicated for each hardware thread, while, resources, such as re-order buffers in reorder/retirement unit 155, load/store buffers, and queues may be shared by hardware threads through partitioning. Other resources, such as low-level data-cache and data-TLB 165, execution unit(s) 160, and parts of out-of-order unit 155 are potentially fully shared.

As can be seen, as certain processing resources are shared and others are dedicated to an architectural state, the line between the nomenclature of a hardware thread and core overlaps. Yet often, a core and a hardware thread are viewed by an operating system as individual logical processors, with each logical processor being capable of executing a thread. Logical processors, cores, and threads may also be referred to as resources to execute transactions. Therefore, a multi-resource processor, such as processor 100, is capable of executing multiple threads.

A remote resource refers to any resource/logical processor, such as a core or thread, other than the resource that is executing a current transaction of interest. As an example, if a first core of a processor is executing a first transaction and the second core is executing a second transaction, from the perspective of the first transaction, the second core is a remote resource and visa versa. Consequently, multiple transactions may be simultaneously and/or concurrently executed in processor 100.

A transaction includes a grouping of instructions, operations, or micro-operations, which may be grouped by hardware, software, firmware, or a combination thereof. For example, instructions may be used to demarcate a transaction. Typically, during execution of a transaction, updates to memory are not made globally visible until the transaction is committed. While the transaction is still pending, locations loaded from and written to within a memory are tracked. Upon successful validation of those memory locations, the transaction is committed and updates made during the transaction are made globally visible. However, if the transaction is invalidated during its pendency, the transaction is restarted without making the updates globally visible. As a result, pendancy of a transaction, as used herein, refers to a transaction that has begun execution and has not been committed or aborted, i.e. pending. Two example systems for transactional execution include a Hardware Transactional Memory (HTM) system and a Software Transactional Memory (STM) system.

A Hardware Transactional Memory (HTM) system often refers to tracking accesses during execution of a transaction with processor 100 in hardware of processor 100. For example, a cache line 166 is to cache data item/object 176 in system memory 175. During execution of a transaction, annotation/attribute field 167, which is associated with cache line 166 is utilized to track accesses to and from line 166. For example, attribute field 167 includes a transaction read bit to track if cache line 166 has been read during execution of a transaction and a transaction write bit to track if cache line 166 has been written to during execution of the transaction.

Attribute field 167 is potentially used to track accesses and detect conflicts during execution of a transaction, as well as upon attempting to commit the transaction. For example, if a transaction read bit in field 167 is set to indicate a read from line 166 occurred during execution of a transaction and a store associated with line 166 from another transaction occurs, a conflict is detected. Examples of utilizing an attribute field for transactional execution is included in co-pending application with Ser. No. 11/027,623 entitled, "Transaction based shared data operations in a Multiprocessor Environment."

A Software Transactional Memory (STM) system often refers to performing access tracking, conflict resolution, or other transactional memory tasks in software. As a general example, compiler 179 in system memory 175, when executed by processor 100, compiles program code to insert read and write barriers into load and store operations, accordingly, which are part of transactions within the program code. Compiler 179 may also insert other transaction related operations, such as initialization, commit or abort operations.

As shown, cache 165 is still to cache data object/item/unit 176, as well as meta-data 177 and transaction descriptor 178. Here, meta-data location 177 is associated with data item 176 to indicate if data item 176 is locked. A read log, which may be present in transaction descriptor 178, is used to log read operations, while a write buffer or other transactional memory, which may include lower-level data cache 165, is used to buffer or log write operations. Inserted calls for validation and commit utilize the logs to detect conflicts and validate transaction operations. Examples of use for transaction descriptor 178 and meta-data location 177 will be discussed in more detail in reference to FIGS. 2 and 3.

Figure 2:
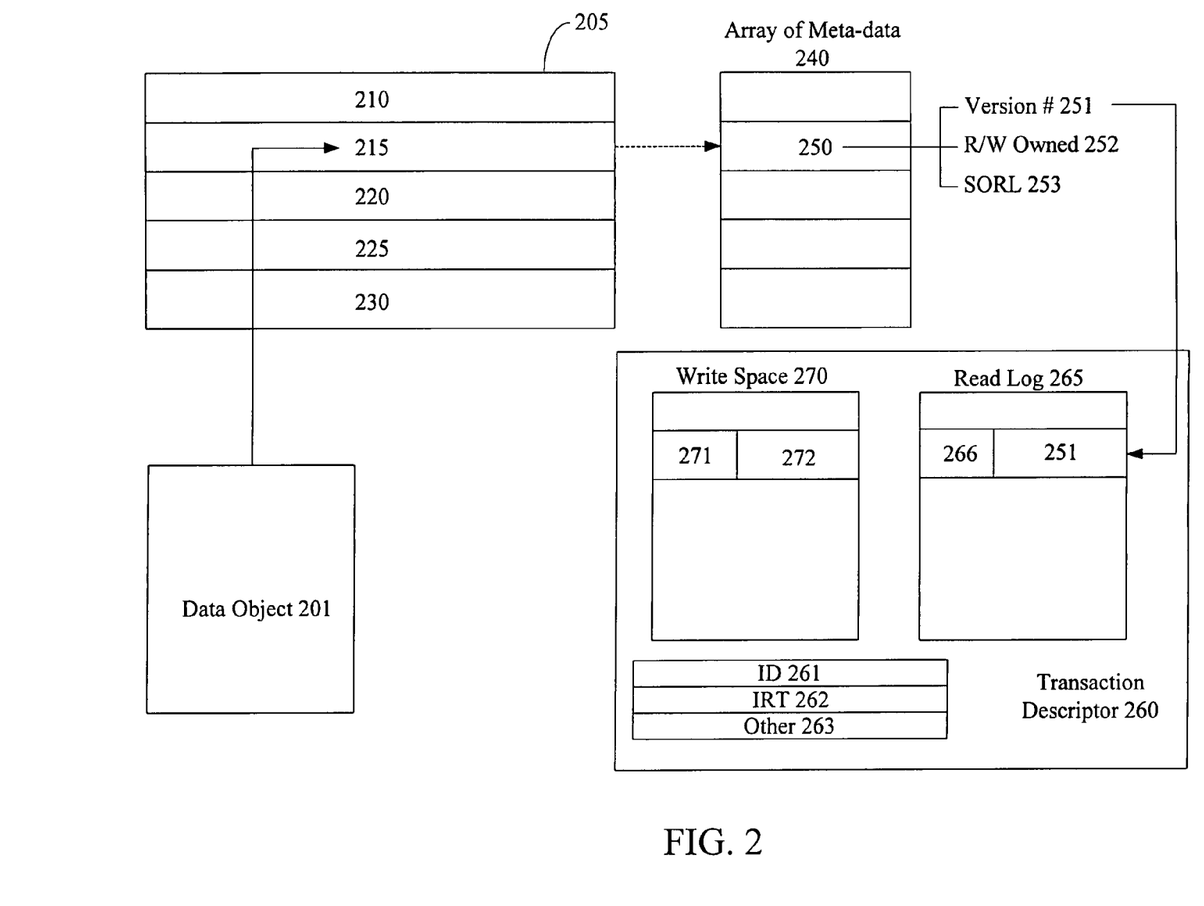
FIG. 2 illustrates an embodiment of a Software Transactional Memory (STM) system capable of designating an irrevocable transaction.

Referring to FIG. 2, an embodiment of a system capable of handling irrevocable transactions is depicted. Data object 201 includes any granularity of data, such as a bit, a word, a line of memory, a cache line, a table, a hash table, or any other known data structure or object. For example, a programming language defined data object is data object 201. Transactional memory 205 includes any memory to store elements associated with transactions. Here, transactional memory 205 comprises plurality of lines 210, 215, 220, 225, and 230. In one embodiment, memory 205 is a cache memory. As an example, data object 201 is to be stored aligned in cache line 215. Alternatively, data object 201 is capable of being stored unaligned in memory 205.

In one example, each data object is associated with a meta-data location, such as a transaction record, in array of meta-data 240. As an illustrative embodiment, an address associated with cache line 215 is hashed to index array 240, which associates meta-data location 250 with cache line 215 and data object 201. Note that data object 201 may be the same size of, smaller than (multiple elements per line of cache), or larger than (one element per multiple lines of cache) cache line 215. In addition, meta-data location 250 may be associated with data object 201 and/or cache line 215 in any manner.

Usually, meta-data location 250 represents whether data object 201 is locked or available. In one embodiment, when data object 201 is unlocked, or available, meta-data location 250 includes a first value. As an example, the first value is to represent version number 251. Here, version number 251 is updated, such as incremented, upon a write to data object to track versions of data object 201.

However, when data object 201 is locked, meta data location 250 includes a second value to represent a first locked state, such as read/write owned state 252. In one embodiment, a transaction lock, such as a read/write lock, is as write exclusive lock forbidding reads and writes from remote resources, i.e. resources that do not own the lock. Here, meta-data 250 or a portion thereof, includes a reference, such as a pointer, to transaction descriptor 260. Any other known lock state may also be used for the first lock state.

An example is discussed below to further illustrate the embodiment of FIG. 2. In response to a first read operation in a transaction referencing data object 201/cache line 215, the read is logged in read log 265. In one embodiment, read log 265 is included in transaction descriptor 260. Transaction descriptor 260 may also include write space 270, as well as other information associated with a transaction, such as transaction identifier (ID) 261, irrevocable transaction (IRT) indicator 262, and other transaction information. However, write space 270 and read log 265 are not required to be included in transaction descriptor 260. For example, write space 270 may be separately included in a different memory space from read log 265 and/or transaction descriptor 260.

In one embodiment, logging a read includes storing version number 251 and address 266 associated with data object 201 or cache 215 in read log 265. Here, assume the version number is one to simplify the example. Upon encountering a write referencing address 266 associated with data object 201, the write is potentially logged or tracked as a tentative update. In addition, the meta-data location is updated to a lock value, such as two, to represent data object 201 is locked by the transaction or resource executing the transaction. In one embodiment, the lock value is updated utilizing an atomic operation, such as a read, modify, and write (RMW) instruction. Examples of RMW instructions include Bit-test and Set, Compare and Swap, and Add.

In one embodiment, the write updates cache line 215 with a new value, and an old value 272 is stored in write space 270. Here, upon committing the transaction, the old values in the write space are discarded, and conversely, upon aborting the transaction, the old values are restored, i.e. the locations are "rolled-back" to their original values before the start of the transaction. In this embodiment, examples of write space 270 include a write log, a group of check pointing registers, and a storage space to log/checkpoint values to be updated during a transaction.

In another embodiment, write space 270 is a buffer that buffers/stores the new value to be written to data object 201. Here, in response to a commit, the new values are written to their corresponding locations, while in response to an abort the new values in write space 270 are discarded. More information on efficient checkpointing and roll-back for transactions is discussed in co-pending related application entitled, "Compiler Technique for Efficient Register Checkpointing to Support Transaction Roll-back," with Ser. No. 11/648,486, issued as U.S. Pat. No. 7,802,136.

Continuing the example from above, whether write space 270 is utilized as a write-buffer, a write-log, or not at all, the write, when committed, releases lock 250. In one embodiment, releasing lock 250 includes returning meta-data location 250 to a value of one to represent an unlocked state. Alternatively, the value is incremented to represent unlocked version value 251 of three. This versioning allows for other transactions to validate their reads that loaded data object 201 by comparing the other transactions logged version values in their read logs to current version value 251 of three after the update.

The example above includes one embodiment of implementing an STM; however, any known implementation of an STM may be used. STMs are discussed in the following articles: "Implementing a High Performance Software Transactional Memory for a Multi-core Runtime" by Bratin Saha, Ali-Reza Adl-Tabatabai, Rick Hudson, Chi Cao Minh, and Ben Hertzberg, *Proceedings of the eleventh ACM SIGPLAN symposium on Principles and practice of parallel programming*; "Software Transactional Memory" by N. Shavit and D. Tuitou, *Proceedings of the Fourteenth ACM SIGACT-SIGOPS Symposium on Principles of Distributed Computing*; "Language Support for Lightweight Transactions", by T. L. Harris and K. Fraser, *Proceedings of the* 2003 *ACM SIGPLAN Conference on Object-Oriented Programming Systems*, Languages and Applications; and "Compiler and runtime support for efficient software transactional memory," by Ali-Reza Adl-Tabatabai, Brian Lewis, Vijay Menon, Brian Murphy, Bratin Saha, and Tatiana Shpeisman. *Proceedings of the* 2006 *ACM SIGPLAN conference on Programming language design and implementation.*"

In fact, any known system for performing transactional memory may also be used, such as an HTM, an STM, an Unbounded Transactional Memory (UTM) system, a hybrid Transactional Memory system, such as a hardware accelerated STM (HASTM), or any other transactional memory system.

As mentioned above, in one embodiment, transaction descriptor 260 includes Irrevocable Transaction (IRT) field 262, when set, to designate the first transaction as an irrevocable transaction. Here, in response to encountering an irrevocable event in a first transaction the transaction is designated as irrevocable. An irrevocable event refers to any event or operation that is expensive or difficult to undo or rescind, as well as any user-defined event/operation, such as a user instruction to designate a transaction as irrevocable. For example, an I/O operation, such as I/O write to an I/O device, may be potentially undone by re-writing an original value back to the I/O device. However, the I/O write is extremely expensive, and therefore, is an example of an irrevocable event.

Other examples of irrevocable events/operations include an I/O operation whose effects cannot be undone, a system call operation, a user-defined irrevocable operation, and a dynamic failure profile of the first transaction to request the first transaction is to be designated as an irrevocable transaction. For the dynamic profile, a count for the number of times a transaction has failed may be kept. When that count reaches a predetermined value, a flag or other value is set to represent on a restart of the transaction, the transaction is to be designated and is to proceed as an irrevocable transaction.

In one embodiment, designating a transaction as an irrevocable transaction includes setting IRT field 262 in transaction descriptor 260. Transaction descriptor 260 includes any data structure to store transaction related information. In the embodiment shown in FIG. 1, transaction descriptor 178 is a data structure stored in a system memory. However, transaction descriptor 260 may be included in any storage element, such as a register or grouping of registers in a microprocessor. Examples of a data structure for transaction descriptor 260 include an array, a multi-dimensional array, a linked-list, or other known computing data structure.

In one embodiment, IRT 262 is initially reset to a default value, such as a logical one. IRT 262 is set to a logical zero to indicate the transaction referenced in ID 261 is designated as an irrevocable transaction. Although, set and reset are used to refer to a logical zero and a logical one, respectively, any value to indicate the transaction referenced in transaction descriptor 260 is an irrevocable transaction may be used to set IRT field 262. Furthermore, IRT field 262 may be included outside of transaction descriptor 260, such as in a register in a processor, and associated with the transaction referenced by transaction ID 261. Here, the register is to hold a first value to indicate the transaction is not designated as irrevocable and a second value to indicate the transaction is designated as irrevocable.

Previously, upon encountering an irrevocable event, a speculative transaction would be aborted as it would be expensive to attempt recovery of an abort, after the irrevocable event was performed in the speculative transaction. However, by designating a transaction as irrevocable, some measures may be taken to decrease the likelihood of an abort allowing the transaction to proceed.

As an example, a second lock state may be specified to allow a resource executing an irrevocable transaction to obtain a lock on a data object, which permits other resources to read the data object but not write to the data object. Here, an abort due to a data conflict from a remote resource updating a data object read by an irrevocable transaction is prevented, by not permitting the remote agent to update the data object. Therefore, remote resource potentially do not have to sit idle waiting for an irrevocable transaction to complete, as they may still load and use restricted data-objects.

In one embodiment, the second lock state is a Single Owner Read Lock (SORL) lock state. In contrast to a read and write lock of data element 201, where only the owner of the lock is allowed to read and write from the location, a SORL allows any resource to read from data object 201, while allowing only the owner to write to data object 201. Here, meta-data location 250 includes a third value to represent the SORL. As above with the read/write lock, the third value, which represents an SORL, may also include a reference to transaction descriptor 260.

For example, meta-data location 250 includes a first version value when unlocked, a second value when read/write locked, and a third value when SORL'ed. Note that both the first values and the third values may reference a version number. In one embodiment, meta-data location 250 is the size of a word. Here, a first portion of meta-data location 250 includes a reference, such as a hash value, to transaction descriptor 260 or to a version number. Furthermore, a second portion of meta-data location 250 may indicate which of the three states meta-data location 250 is in. As an example, the second portion includes two bits, such as the two least significant bits, in meta-data 250. When the two bits represent an odd number, i.e. the least significant bit is set, then meta-data 250 includes a version number. In addition, when meta-data location includes an even number, i.e. the least significant bit is reset to a logical zero, then meta-data location is in a read/write locked state or a SORL state. Table A below shows an illustrative embodiment of values to be stored in meta-data location 250.

TABLE A

An embodiment of values to be stored in meta-data 250

|  | First Portion | 2nd Portion (2 LSB) | State |
|---|---|---|---|
| First Value | Version number | X1 | Unlocked |
| Second Value | Trans Descriptor | 00 | R/W locked |
| Third Value | Version number | 10 | SORL |

In this illustrative example, data object 201 is initially in an unlocked state, including a first version number. Here, assume the meta-data 250 includes a logical one, where first portion includes logical zeros and the second portion includes the binary 01. When a resource acquires a read/write lock for data-object 201, an operation, such as an atomic read, modify, write (RMW) operation, updates meta-data 250 to a 00 in the second portion and a reference to transaction descriptor 260 in the first portion. If the resource updates data object 201, upon commit of the transaction, meta-data location 250 is modified to the next odd version number, such as three, i.e. 01, to represent that data object 201 is unlocked and has been modified since version one.

When the resource acquires an SORL for data object 201, meta-data 250 is set to the third value including the first portion referencing a version number and the second portion including the binary value 10. Table A is an illustrative embodiment of values to be held in meta-data 250; however, meta-data 250 may hold any values to represent an unlocked, read/write locked, or SORL state.

When in an SORL state, other resources may read data object 201, but may not write and/or acquire a read/write lock to update data object 201. However, the owning resource may update data object 201. In response to attempting a write, the owning resource of an SORL is able to determine it is the owner of the SORL. In one embodiment, a single irrevocable transaction is allowed to continue in a system; therefore, the irrevocably designated transaction is the owner of any SORLs. As stated above, referenced transaction descriptor 260 potentially includes Irrevocable Transaction (IRT) field 262 to designate the associated transaction, which is referenced by transaction identifier (ID) 261, as irrevocable.

In one embodiment, in response to encountering an irrevocable event/operation in a transaction, previous reads/loads in the transaction are validated and SORLs for those reads/loads are acquired. For example, assume a first read operation in a transaction references data object 201. Upon detecting an irrevocable event the first read operation is validated. In one embodiment, validation includes comparing a version value logged in read log 265 upon performing the first read with current version value 251 in meta-data location 250. If the versions are the same, then no update to data object 201 has occurred and the read is valid. However, if the versions are different, a remote resource has updated data object 201 and the read is not valid.

This validation is done in case the read became invalid before the irrevocable event was detected. In this case, if a lock were acquired without validating the read, then at the end of the transaction the read would be determined to be invalid and the transaction would be aborted with the irrevocable event having been performed. Therefore, once the first read operation is determined to be valid in response to detecting the irrevocable transaction, an SORL is acquired for data object 201 to ensure the read is not invalidated after performing the irrevocable event.

SORLs are also acquired for subsequent reads encountered after detecting the irrevocable event and designating the transaction as irrevocable. Once again, the SORLs are to allow read but not write access to an associated data object, which permits the irrevocable transaction to complete without having remote resources updating SORL'ed data-objects.

Figure 3:
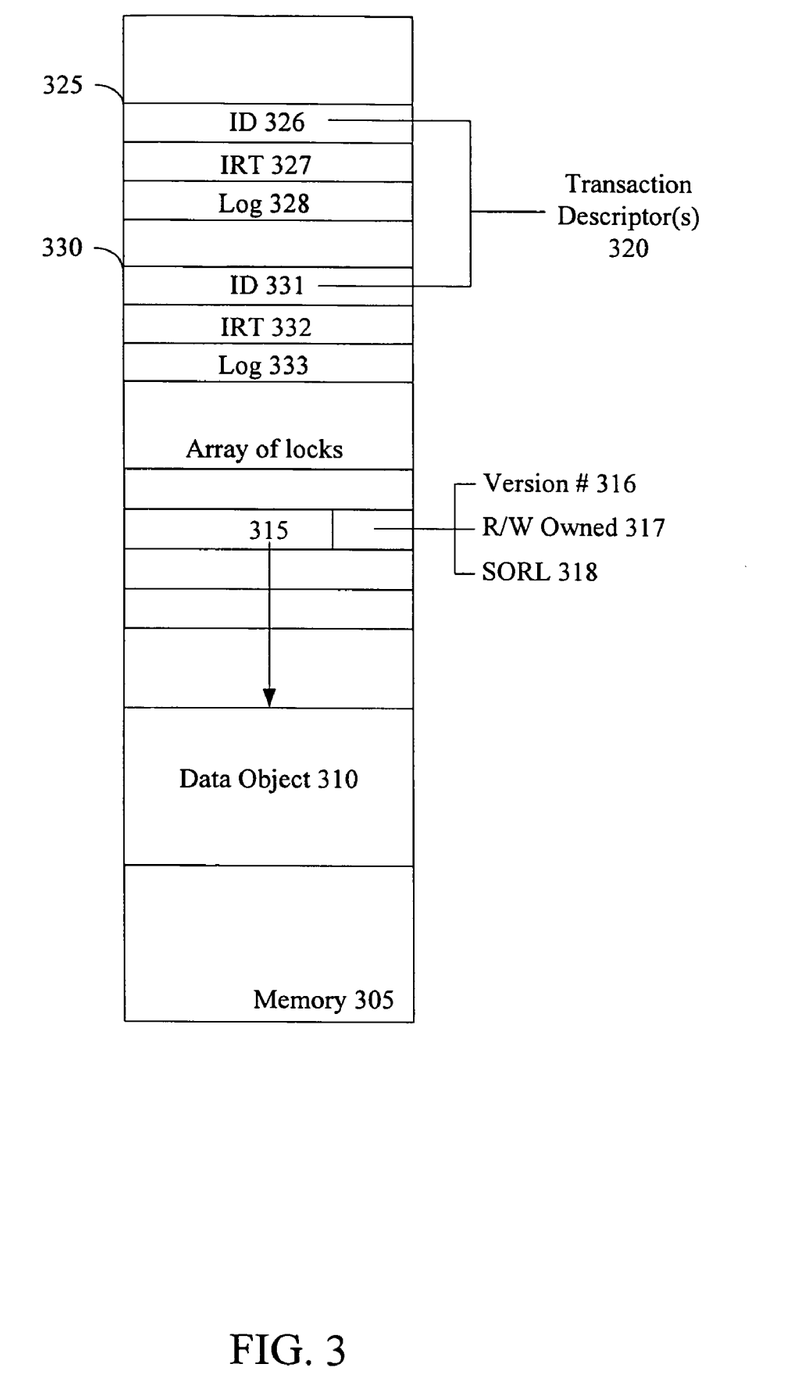
FIG. 3 illustrates an embodiment of a memory device to store a transaction descriptor, an array of meta-data, and a data object.

Turning to FIG. 3 an embodiment of a system memory capable of storing multiple transaction descriptors is illustrated. As mentioned above, a multi-resource, i.e. multi-core or multi-threaded, processor is potentially capable of executing transactions concurrently. As a result, multiple transaction descriptors or multiple transaction descriptor entries may be stored in memory 305.

In the embodiment shown, transaction descriptor 320 is a linked list including entries 325 and 330. Entry 325 includes transaction ID field 326 to hold a transaction ID, an irrevocable transaction (IRT) field 327 to hold a first value to represent a default transaction state and a second value to represent an irrevocable transaction state, and log space 328 to include read and/or write logs. Other information, such as a resource structure, i.e. thread/core structure, of the processor may also be stored in transaction descriptor 320. Entry 330 includes similar fields 331, 332, and 333.

Yet, as a processor is capable of simultaneous transactional execution, conflicts may arise between multiple irrevocable transactions. Therefore, in one embodiment, a single irrevocable transaction is allowed to proceed at a given time. For example, assume transaction ID 326 references a first transaction being executed with a first resource on a processor and transaction ID 331 references a second transaction being concurrently executed on a second resource of the processor. Then the first transaction encounters an irrevocable event and sets IRT field 327 to designate the first transaction as an irrevocable transaction. Later, the second transaction encounters an irrevocable event and attempts to set IRT field 332 to designate the second transaction as an irrevocable transaction.

Here, the microprocessor is to select either the first or the second transaction to be designated as an irrevocable transaction. In one embodiment, a priority scheme, such as a first in time, last in first out, first in first out, or other priority scheme may be utilized to select the transaction to proceed as irrevocable. Furthermore, in one embodiment, the transaction not selected to proceed as irrevocable is suspended until the selected transaction commits, and then proceeds to completion. Alternatively, the transaction not selected may be aborted.

For example, assume the first transaction is selected as the irrevocable transaction, as it encountered and performed an irrevocable event/operation before the second transaction. The second transaction is suspended, while the first transaction acquires SORLs for read operations and completes. Upon completion of the first transaction, a read set for the second transaction is validated and SORLs acquired for those reads. The second transaction is then designated as an irrevocable transaction and executes to completion.

In addition to conflict resolution among multiple potential irrevocable transactions, conflicts between irrevocable transactions and revocable transactions regarding data objects may also be performed. For example, assume a remote resource, which is executing a remote transaction, sets meta-data location 315 to the second value to acquire a read/write lock on data object 310. Next, a current resource, which is executing a second transaction, encounters an irrevocable event in the second transaction. In response to the irrevocable event, IRT field 332 is set to designate the second transaction as an irrevocable transaction. Then, the current resource encounters a read operation in the second transaction referencing a data object 310. A SORL is to be acquired for data object 310, but the remote transaction owns a read/write lock on data object 310.

Consequently, the processor, which includes the current and remote resource, is to perform conflict resolution between the current and remote resource, as the irrevocable transaction is selected to continue execution. Note that performing conflict resolution with the processor may include any method of resolution executed by the remote resource, the current resource, or another resource on the processor.

In one embodiment, the processor is to implement a conflict resolution policy, such as executing conflict resolution code to resolve the locking conflict. As a first example, the conflict resolution policy includes aborting execution of the remote transaction on the remote resource to free up the lock on data object 310. When the remote resource is aborted, the current resource acquires an SORL and performs the read operation. As a second example, the current resource waits until the remote resource releases the lock in meta-data 315. Once the lock is released, the current resource acquires an SORL on data object 310.

A combination of the first two examples may also be used, where the current resource waits for a predetermined amount of time, such as a predetermined value counted down from in a watchdog timer, and then aborts the remote resource if the lock is not released within the predetermined amount of time. Here, the remote resource is given a chance to complete execution and release the lock. However, if the lock is not release in a given amount of time, then the remote resource is aborted and an SORL is acquired by the current resource for data object 310. Note that any other resolution policy may be used to determine how an irrevocable transaction is able to acquire an SORL on a data object locked by another processing resource.

Figure 4A:
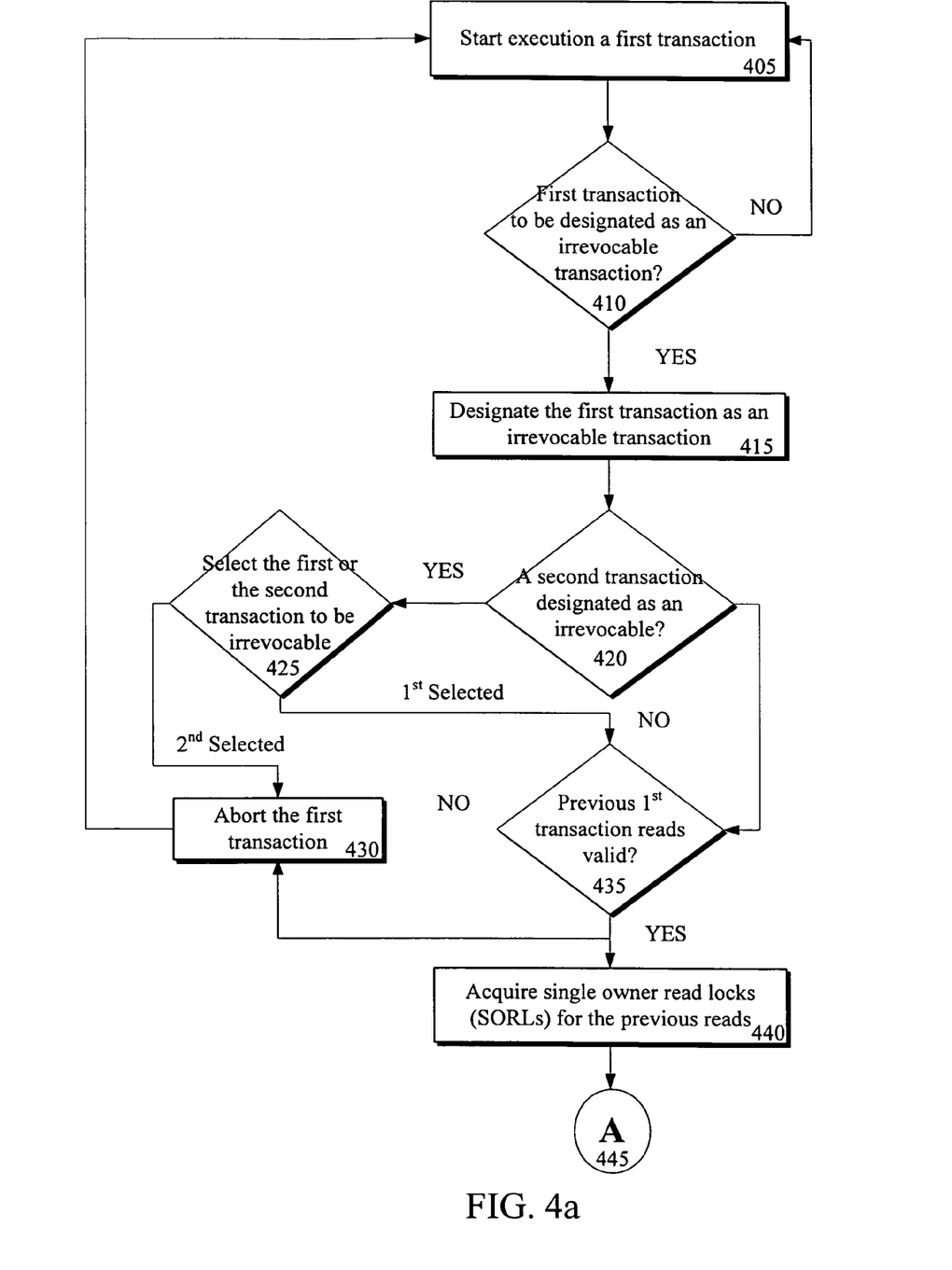
FIG. 4a illustrates an embodiment of a flow diagram for an execution flow to designate a transaction as an irrevocable transaction.
Figure 4B:
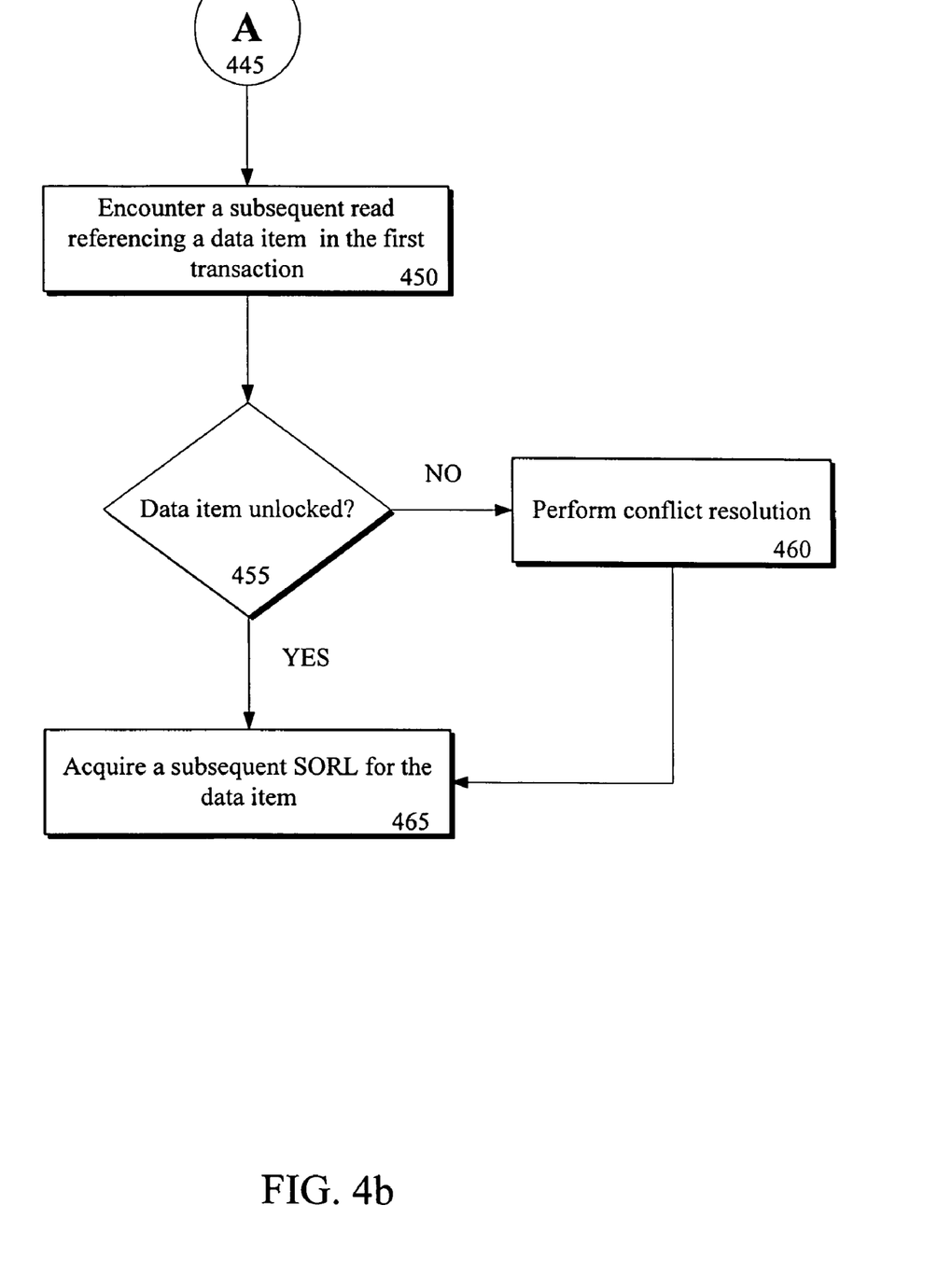

Turning to FIGS. 4a and 4b an embodiment of a flow diagram for a method of designating and handling an irrevocable transaction is illustrated. In flow 405, execution of a first transaction is started. In one embodiment, a start transaction instruction is executed. Next in flow 410, it is determined if a first transaction is to be designated as an irrevocable transaction.

In one embodiment, a user-defined instruction, such as a start_irrevocable_transaction instruction, is detected. Here, a user includes an irrevocable identifying instruction to select a transaction as irrevocable, which allows a user the ability to select specific transactions to be given higher execution priority through the ability to acquire SORLs. In another embodiment, an irrevocable event is detected, such as an I/O event/operation or a predetermined number of failures of the first transaction. Note that any number of operations may be executed in the first transaction before an irrevocable event/operation is encountered causing a transaction to be designated as an irrevocable transaction.

In response to determining the first transaction is to be designated as an irrevocable transaction, the first transaction is designated as an irrevocable transaction in flow 415. In one embodiment, designating the first transaction as an irrevocable transaction includes setting an irrevocable transaction field in a storage element to designate the first transaction is an irrevocable transaction.

In flow 420, it is determined if a second transaction is designated as an irrevocable transaction. If another transaction is designated as an irrevocable transaction, then in flow 425, either the first or the second transaction is selected as an irrevocable transaction to continue execution. If the second transaction is selected, then in flow 430, the first transaction may be aborted, if the first transaction is holding a lock on a data element requested by the second transaction. Alternatively, the first transaction may be suspended or performed without being designated as irrevocable. Here, any priority scheme for selecting between multiple potential irrevocable transactions may be used, including a first in time, a last in time, a user-definable, or any other known selection scheme. In an alternate embodiment, when a second transaction is selected as the irrevocable transaction, the first transaction is not aborted, but rather suspended until the second transaction completes. The first transaction then continues execution at flow 435 after the second transaction completes.

Note that the blocks in the illustrated flow of FIG. 4a may be placed in any order. For example, determining if multiple transactions are to be designated irrevocable and selecting between them in flows 420, 425, 430, and 435 may be placed before flow 415, so that the selection is made before the first transaction is designated in the storage element as an irrevocable transaction Whether the first transaction is selected in flow 425 or the first transaction is resuming after suspension, in flow 435 a read set associated with the first transaction is validated. As stated above, previous load operations are validated to ensure the loaded locations have not been updated since they were read. Here, logged/previous version values associated with a plurality of previous read operations in the first transaction are compared with a plurality of corresponding current version values. If the version values differ, then the read set is not valid and the transaction is aborted in flow 430. However, if the values are the same, then the read set is valid and a Single-Owner Read Lock (SORL) is acquired for each of the plurality of previous reads in flow 440. Any method of read validation may be used, such as utilizing are hardware acceleration field to ensure reads are valid, as discussed above in reference to the discussion of an HTM.

In one embodiment, acquiring an SORL includes setting a meta-data location associated with a data object/memory location referenced by each of the plurality of previous read operations to a first value to represent a SORL state.

The flow continues to FIG. 4b through flow 445. After validating the read set, the irrevocable event may be performed, if the irrevocable event includes an operation to be performed. Subsequently, a read/load operation referencing a data item is encountered in the first transaction in flow 450. Next, in flow 455 it is determined if the data item is unlocked. In one embodiment, determining if the data item is unlocked includes checking a meta-data location associated with the data item. If the meta-data location includes a first version value, the data item is unlocked and an SORL is acquired for the data item in flow 465. Here, the meta-data location is set to an SORL value to acquire an SORL for the data item.

However, if the meta-data location, when checked, includes a second value to represent a second resource owns a lock on the data item, then in flow 460 conflict resolution is performed. In one embodiment, conflict resolution includes aborting a second resource that owns the lock on the data-item before acquiring the subsequent SORL for the first resource executing the first transaction. As another example, the first resource waits until the second resource sets meta-data location to a version value to release the lock on the data item before acquiring the SORL. In yet another embodiment, the first resource waits for a specified period, and then aborts the second resource, if the second resource has not released the lock in the specified period. Finally, the read operation is performed after the SORL is acquired.

As illustrated above, execution of transactions including an irrevocable event may be continued upon encountering the irrevocable event, instead of aborting the transaction and wasting execution cycles. In one embodiment, instead of acquiring a read/write lock for every operation in an irrevocably designated transaction, SORLs are acquired for data objects to be read, which allows other remote resources to still load from the data objects, while ensuring the data objects are not modified by those remote resources.

The embodiments of methods, software, firmware or code set forth above may be implemented via instructions or code stored on a machine-accessible or machine readable medium which are executable by a processing element. A machine-accessible/readable medium includes any mechanism that provides (i.e., stores and/or transmits) information in a form readable by a machine, such as a computer or electronic system. For example, a machine-accessible medium includes random-access memory (RAM), such as static RAM (SRAM) or dynamic RAM (DRAM); ROM; magnetic or optical storage medium; flash memory devices; or other form of tangible storage for storing or transmitting transmission media, such as an electrical, optical, acoustical or other form of propagated signals (e.g., carrier waves, infrared signals, digital signals); etc.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In the foregoing specification, a detailed description has been given with reference to specific exemplary embodiments. It will, however, be evident that various modification and changes may be made thereto without departing from the broader spirit and scope of the invention as set forth in the appended claims. The specification and drawings are, accordingly, to be regarded in an illustrative sense rather than a restrictive sense. Furthermore, the foregoing use of embodiment and other exemplarily language does not necessarily refer to the same embodiment or the same example, but may refer to different and distinct embodiments, as well as potentially the same embodiment.

What is claimed is:

1. A method comprising:
    executing a transaction, wherein the transaction is initially designated as a revocable transaction;
    encountering an irrevocable event during executing the transaction;
    in response to encountering the irrevocable event during executing the transaction as a revocable transaction:
        converting the transaction from being designated as a revocable transaction to being designated as an irrevocable transaction;
        determining if a plurality of previous read operations in the transaction performed before encountering the irrevocable event are valid; and
        acquiring a single-owner read lock (SORL) for each of the plurality of previous read operations, in response to the plurality of previous read operations being valid.

2. The method of claim 1, wherein
    the irrevocable event is selected from a group consisting of an I/O operation, a system call operation, and a user-defined irrevocable operation.

3. The method of claim 1, wherein converting the transaction from being designated as a revocable transaction to being designated as an irrevocable transaction comprises: setting an irrevocable transaction field in a storage element to designate the first transaction as an irrevocable transaction.

4. The method of claim 1, wherein determining if a plurality of previous read operations in the transaction are valid comprises: validating each of the plurality of previous read operations based on a hardware acceleration field associated with a memory location referenced by each of the plurality of previous read operations.

5. The method of claim 1, wherein determining if a plurality of previous read operations in the transaction are valid comprises:
    comparing a plurality of previous version values associated with the plurality of previous read operations in the transaction with a plurality of corresponding current version values, the plurality of previous version values to be stored in a log associated with the transaction; and
    determining the plurality of previous read operations in the transaction are valid in response to the plurality of previous version values and the plurality of corresponding current version values being the same.

6. The method of claim 1, wherein acquiring a SORL for each of the plurality of previous reads comprises: setting a meta-data location associated with a memory location referenced by each of the plurality of previous read operations to a first value to represent a SORL state.

7. The method of claim 1, further comprising:
    determining if a subsequent data item referenced by a subsequent read operation, is unlocked, the subsequent read operation being subsequent to converting the transaction from being designated as a revocable transaction to being designated as an irrevocable transaction;
    acquiring a subsequent SORL for the subsequent data item, in response to the subsequent data item being unlocked; and
    performing the read operation.

8. The method of claim 7, wherein determining if a subsequent data item referenced by the subsequent read operation is unlocked comprises:
    checking a meta-data location associated with the subsequent data item;
    determining the subsequent data item is unlocked, if the meta-data location includes a first version value;
    determining the subsequent data item is locked, if the meta-data location includes a second locked value.

9. The method of claim 8, further comprising: aborting a second resource associated with the meta-data location before acquiring the subsequent SORL, if the subsequent data item is locked, wherein acquiring the subsequent SORL includes setting the meta-data location to a third SORL value.

10. A non-transitory machine readable medium including program code which, when executed by a machine, causes the machine to perform the operations of:
    loading a previous data item in response to executing a previous transactional read operation within a first transaction;
    detecting an irrevocable event in the first transaction after loading the previous data item in response to executing the previous transactional read operation within the first transaction;

converting the first transaction from a revocable transaction to a non-revocable transaction without restarting the first transaction, wherein converting the first transaction from a revocable transaction to a non-revocable transaction comprises marking the first transaction as an irrevocable transaction in response to detecting the irrevocable event;

in response to marking the first transaction as an irrevocable transaction acquiring a first single-owner read lock (SORL) for the previous data item associated with the previous transactional read operation; and encountering a subsequent read operation in the first transaction; and acquiring a second SORL for a subsequent data item associated with the subsequent read operation, in response to encountering the subsequent read operation.

11. The machine readable medium of claim 10, wherein the irrevocable event is selected from a group consisting of an I/O operation, a system call, a user irrevocable transaction call, and a irrevocable transaction request in response to the first transaction failing a predetermined number of times.

12. The machine readable medium of claim 10, wherein acquiring a first single-owner read lock (SORL) for a previous data item associated with a first previously executed read operation during execution of the first transaction comprises setting a first meta-data location associated with the previous data item to a SORL state, and wherein acquiring a second SORL associated with the subsequent data item comprises setting a second meta-data location associated with the subsequent data item to the SORL state.

13. The machine readable medium of claim 12, further comprising:

reading a value stored in the second meta-data location;

determining the subsequent data item is unlocked, if the value represents an unlocked state;

determining the subsequent data item is locked, if the value represents a read and write locked state;

aborting a second resource in response to determining the subsequent data item is locked before acquiring the second SORL associated with the subsequent data item.

* * * * *